United States Patent [19]

Sutch

[11] 4,123,214
[45] Oct. 31, 1978

[54] CONTAINERS

[75] Inventor: Brian L. C. Sutch, Thames Ditton, England

[73] Assignee: Airfix Industries Limited, London, England

[21] Appl. No.: 801,005

[22] Filed: May 26, 1977

Related U.S. Application Data

[63] Continuation of Ser. No. 581,670, May 28, 1975, abandoned.

[30] Foreign Application Priority Data

May 28, 1974 [GB] United Kingdom ............... 23663/74

[51] Int. Cl.² ............................................. B29F 1/10
[52] U.S. Cl. .................................. 425/129 R; 249/91; 425/123; 264/262
[58] Field of Search ................... 425/129 R, 126, 127, 425/125, 123, 128, 110, 112; 264/261, 262, 275; 249/84, 85, 91, 83

[56] References Cited

U.S. PATENT DOCUMENTS

| 3,260,777 | 7/1966 | Brandt | 264/262 |
| 3,511,902 | 5/1970 | Santangelo | 425/112 X |
| 3,930,770 | 1/1976 | Gaudet | 425/129 R X |
| 4,021,524 | 5/1977 | Grimsley | 264/262 X |

Primary Examiner—Francis S. Husar
Assistant Examiner—William R. Briggs
Attorney, Agent, or Firm—Scrivener, Parker, Scrivener & Clarke

[57] ABSTRACT

Apparatus for making a frusto-conical container from a blank having a base panel and side panels which are folded relative to the base, clamped between tools of an injection moulding machine and seamed by injected material fed along one face of the blank, the other faces of the side panels spanning a circumferential channel into which they are forced by injected material to form a circumferential bead, at the axial seams the channel being reduced in depth to support the side panels against displacement of the edges by injected material such as will allow injected material to reach that face of the blank nearest the channel.

3 Claims, 7 Drawing Figures

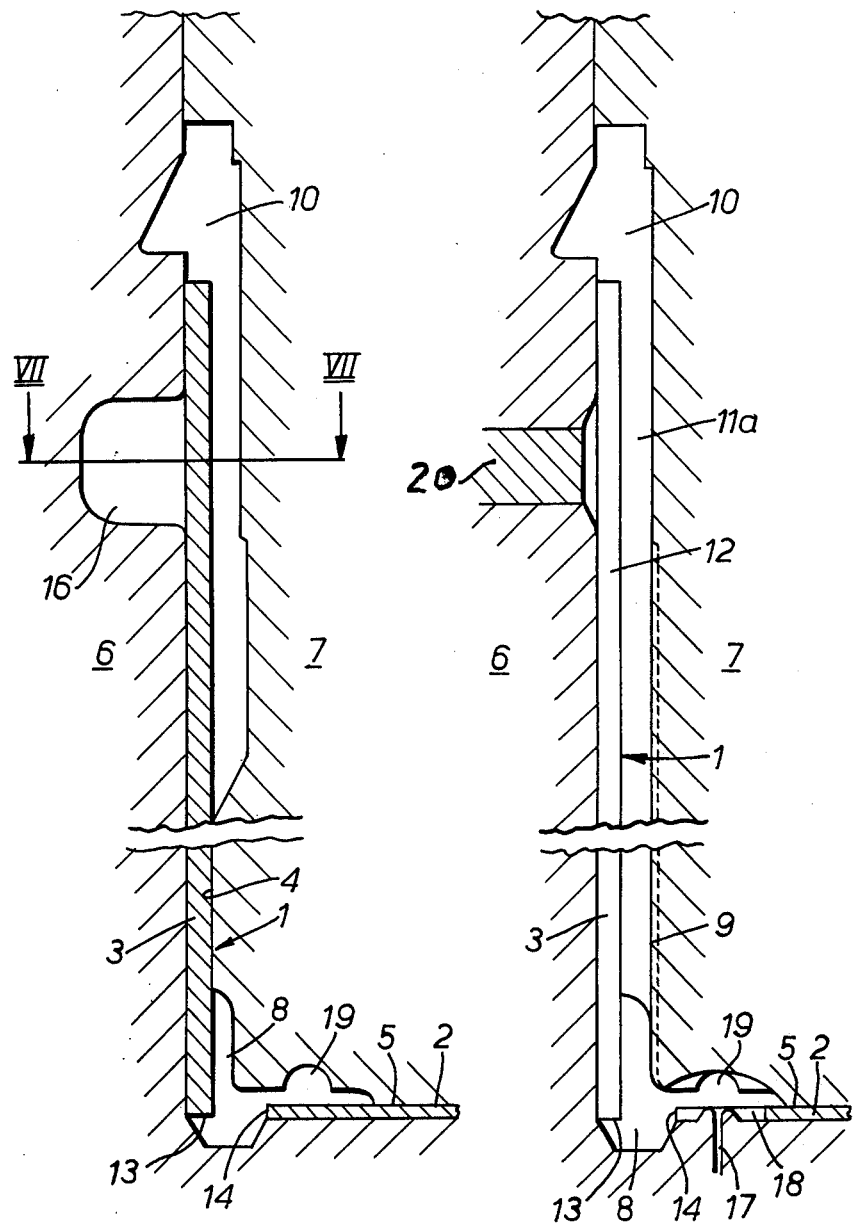

CONTAINERS

This is a continuation of application Ser. No. 581,670, filed May 28, 1975, and now abandoned.

The present invention relates to improvements in containers particularly of the type having a peripheral wall formed of flexible sheet material constrained to shape by injection mouldings, for example as described in the United Kingdom patent specifications Nos. 976,635 and 1,348,370.

A composite container comprising flexible sheet material and an injection moulding constraining the sheet to the shape of the container can be produced from a single arcuate blank, which will form a frusto-conical wall for the container when two opposite edges are juxtaposed and seamed. Another form of container can be made from a blank having a polygonal end panel from each side of which extends a side panel, adjacent side panels when folded relative to the base being seamed. In another arrangement a blank has an end panel from arcuate edges of which side panels project. These side panels are folded relative to the end panel, are constrained to conform with the arcuate periphery of the end panel and are seamed, one to another and to the end panel.

In each case, the blank is positioned in the final shape between mould tools which define a blank cavity which receives the blank and a mould cavity in the region of the seam or seams to be formed. Material is then injected into the mould cavity.

For various purposes including strengthening and lid anchoring purposes, a bead may be formed on the blank during the injection moulding by the injected material flowing along a path on one face of the sheet material and forcing that material into a bead mould channel spanned by the other face of the material. Thereby a bead is made comprising a plastics filled sheet material channel.

If, for example, material is fed along a seam cavity on the inside face of juxtaposed edges to form a seam, and a feed or lip cavity is provided extending out of that seam cavity to provide a flow path for forming the bead, the injected material, when it reaches the region of the bead mould channel, tends to separate the juxtaposed edges of the blank which are unsupported where they overlie the bead mould channel and flows through the increased gap to the bead mould channel and thereby to the outside surface of the blank. This makes the container commercially unacceptable and it must be rejected.

According to the present invention there is provided a method of making a composite container which comprises positioning blank sheet material in a blank cavity defined by mould tools with edges to be seamed juxtaposed, which tools define a seam mould cavity in the region of said juxtaposed edges, a beam mould channel and a feed or lip cavity communicating with the seam cavity, the blank sheet material extending between the feed or lip cavity and the bead mould channel, and injecting material into the seam cavity and thence to the feed or lip cavity, the bead mould channel depth being reduced in the zone where the bead mould channel overlies the seam cavity thereby to support the juxtaposed edges in that zone against displacement during initial stages of injection such as to allow flow of the injected material to the exterior of the blank material.

The bead mould channel depth may be permanently reduced resulting in a small "flat" on the bead where it crosses the seam in the finished product or the reduction may be temporary during the moulding. Such a temporary reduction may be provided by a retractable backup element or pin which provides initially reduction of the bead mould channel depth to establish the correct and preferred flow path to the feed channel and then is retracted or displaced to increase the bead mould channel depth and allow the blank to be deformed and filled with injected material at the junction with the seam thereby obtaining a bead of constant size all round the container.

According to the present invention there is also provided apparatus for making a composite container including a core tool and a cavity tool which together define a blank cavity to receive blank sheet material in the shape of the container to be produced, a seam cavity to form a seam between juxtaposed edges of the blank material on one face of the blank material, a feed or lip cavity communicating with the seam cavity, and a bead mould channel to which the face of the material remote from the seam will be exposed, overlying the feed or lip cavity, in the absence of the blank material the bead mould channel communicating with the feed or lip cavity and with the seam cavity, means being provided which reduce the depth of the bead mould channel at least during the initial stages of injecting material to support the juxtaposed edges in that zone against displacement such as to allow flow of injected material to the exterior of the blank material at those edges.

In order that the invention may be well understood there will now be described an embodiment thereof given by way of example only, reference being had to the accompanying drawings, in which:

FIG. 2 is an axial section through a pair of mould tools with a container blank therebetween, taken substantially on the line II—II of FIG. 7;

FIG. 3 is another axial section through the mould tools of FIG. 2, on the line III—III of FIG. 7, the showing the seam cavity;

Figure 1:
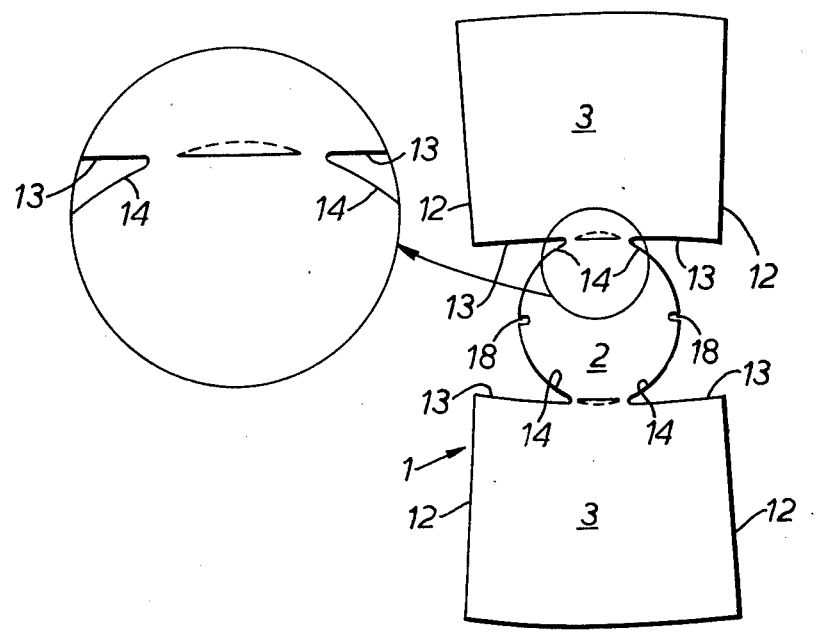
FIG. 1 is a plan view of a blank for making a container.

As shown in the drawings, the container is made from a blank 1 of flexible sheet material having a base panel 2 and two peripheral wall forming side panels 3 extending from the base panel, for example as described in application Ser. No. 441,892, now U.S. Pat. No. 3,931,385. The blank is positioned between mould tools defining a blank cavity, for example as described in U.S. Pat. No. 3,868,893. The blank cavity comprises a peripheral wall cavity part 4 and a base cavity part 5 defined by a mating cavity tool 6 and core tool 7 respectively. The tools also define base to side panel seam cavity 8, side panel to side panel seam cavities 9, and a circumferential feed or lip cavity 10. Moulding material is injected into these cavities to form side seams 11 to unite edges 12 of the peripheral wall-forming side panels 3, a base seam 8a including a downwardly directed foot 8b uniting the edges 13, 14 of the base and side panels 2,3, respectively, and a lip 15 around the open end of the peripheral wall.

A bead mould channel in the form of a channel 16 extends circumferentially of the cavity tool and in the absence of sheet material in the cavity part 4, communicates with the seam cavity 9 and feed or lip cavity 10. In the presence of sheet material the bead mould channel 16 is separated from cavities 9, 10 by the sheet material, as can be seen in FIG. 2.

When material is injected into the base seam cavity 8 through pin gates 17 with which register openings 18 formed in the blank, the injected material flows along an enlargement 19 in that limb of L-section cavity 8 which overlies the edge region of panel 2. This enlargement forms a preferred flow path for the material. When the enlargement is full, the material flows radially outwards pressing the periphery of the base against the cavity tool 6 then the side panels against the cavity tool. Where the downwardly projecting foot 8b is incorporated in the base to side panel seam 8a as shown, this foot is interrupted circumferentially so that it does not constitute a circumferential preferred flow path. At the seam cavity 9 the material flows up the seam.

Figure 6:
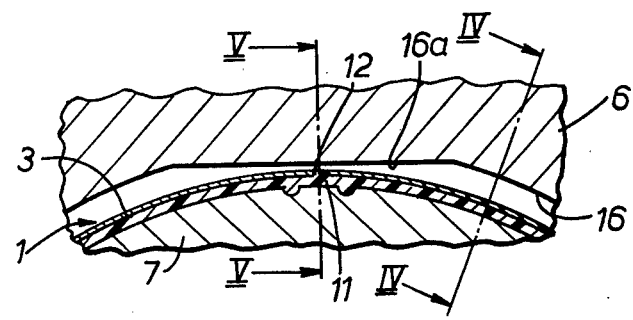
FIG. 6 is a reduced transverse cross-sectional view taken substantially on the line VI—VI of FIG. 4.
Figure 4:
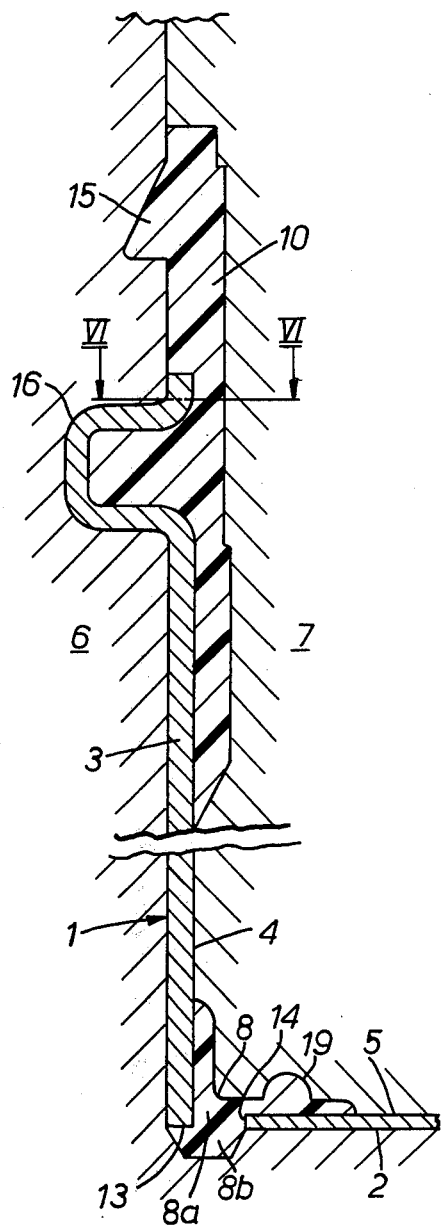
FIG. 4 is a sectional view similar to FIG. 2 but showing the position of the blank after it has been forced into the bead mould channel by the injected material, the sectional view being taken substantially on the line IV—IV of FIG. 6.
Figure 5:
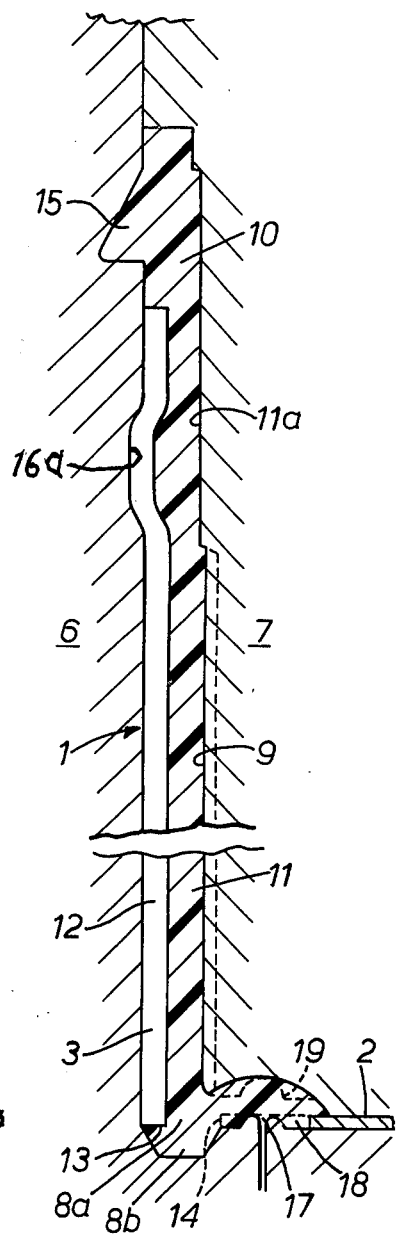
FIG. 5 is a view similar to FIG. 3, being taken substantially on the line V—V of FIG. 6, after the injection of plastic material into the mould cavity.
Figure 7:
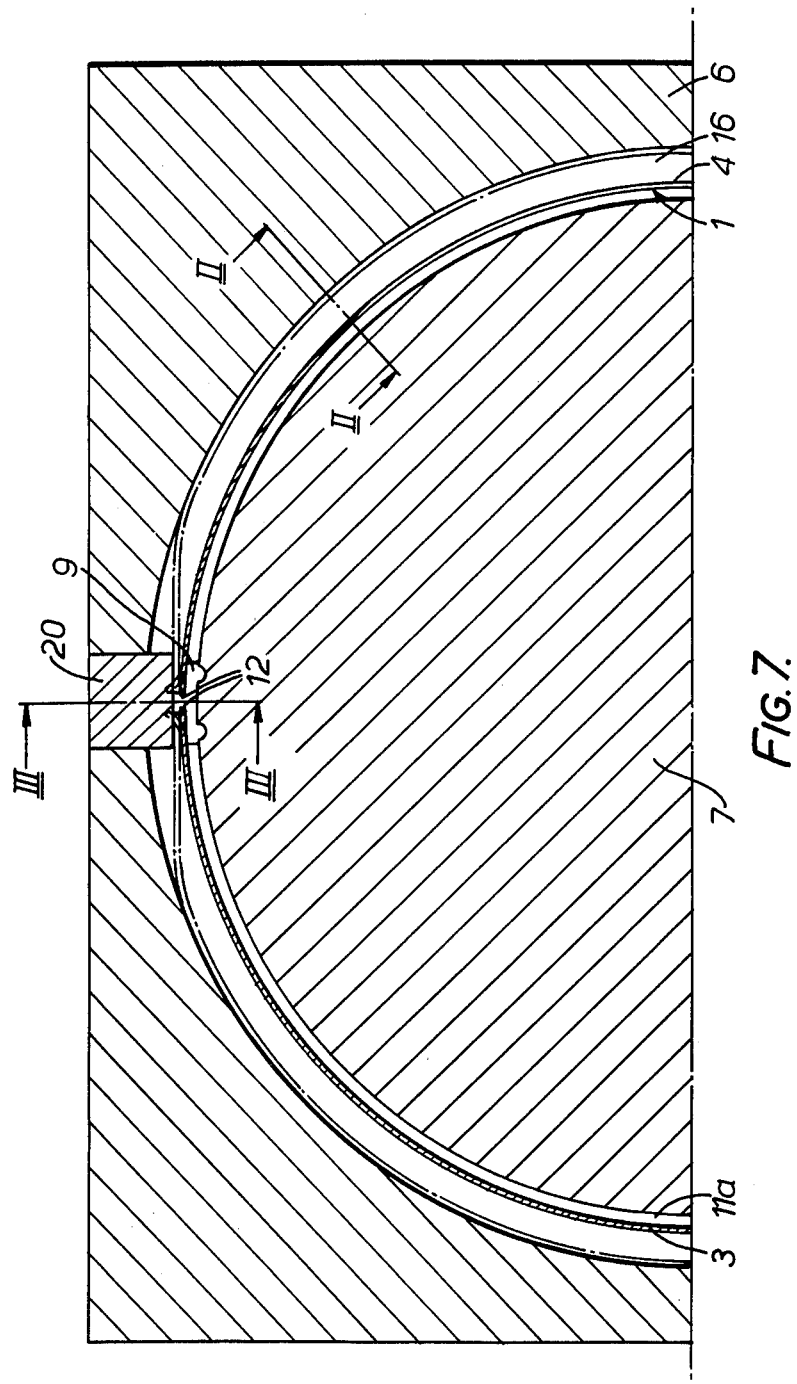
FIG. 7 is a transverse cross-sectional view taken substantially on the line VII—VII of FIG. 2.

There is a tendency, when the injected material reaches the level of channel 16, for the juxtaposed axial edges 12 of the panels 3, as shown by the phantom lines in FIG. 7, to be separated by the injected material as it flows from the seam channel 9 on to the sheet material overlying channel 16. If this were to occur, injected material would reach the external surface of the blank and form a blemish, rendering the container unacceptable. As shown in FIGS. 5 and 6, this problem is avoided by substantially reducing the depth of channel 16 at its junction with seam cavity 9. The channel 16 can be omitted at the junction with seam cavity 9, as shown at 16a in FIG. 6, provided, of course, there is a defined flow path as shown at 11a in FIGS. 3 and 5, for the plastics material to the inner surface of the blank overlying the start of the channel 16.

An alternative to the omission of the channel 16 at its junction with seam cavity 9 is the provision of retractable means, such as a plunger, diagrammatically indicated at 20 in FIGS. 3 and 7, which extends into the channel 16 and is continuous across the cavity 9 to back up the sheet material against displacement and separation, as shown by the dotted lines in FIG. 7, until a flow path of plastics material has been established over the inside of the sheet material forcing it into the channel 16 at points spaced from cavity 9.

At the stage the retractable means can be retracted to allow the sheet material to be forced into the channel 16 at the region of seam cavity 9.

A particular advantage of the above described method is that the deformation of the sheet material to produce the bead is effected during formation of the container. This avoids the need for deformation of the blank which is expensive and would lead to complications in blank storage and feed to the mould cavity.

While the invention has been described as applied to a container using two particular blank configurations, it will be appreciated that it is applicable to any container in which the peripheral wall is formed of one or more pieces of flexible sheet material which may or may not be integrally coupled together apart from the seaming operation. Further it will be appreciated that the channel may have other sections than that shown. For example it may have an arcuate section or may have a more acutely angular section.

I claim:

1. Apparatus for making a composite container of sheet material and injection moulded plastic comprising a core tool and a cavity tool which together define a blank cavity to receive blank sheet material in the shape of the container to be produced, one of the tools including a seam cavity to form a seal between juxtaposed edges of the blank material on one face of the blank material and a feed cavity communicating with the seam cavity, and the other tool including a bead mould channel, to which the face of the sheet material remote from the seam will be exposed, overlying the feed channel and in the absence of the blank sheet material the bead mould channel communicates with the feed channel and with the seam cavity, gate means in said cavity tool for injecting plastic material into said seam cavity and thence into said feed cavity to force the overlying portion of the sheet material into said bead mould cavity, and means reducing the depth of the bead mould channel, at least during the initial stages of injecting material, in the area where said channel overlies the seam cavity so as to prevent injected material in that area from spreading apart the juxtaposed edges of a blank of sheet material and flowing to the exterior of the blank material at those edges.

2. Apparatus according to claim 1 in which the bead mould channel overlying the seam cavity is permanently of a depth less than the parts of the bead mould channel remote from the seam cavity.

3. Apparatus according to claim 2 in which retractable means are provided to reduce the depth of the bead mould channel at least during initial stages of injection.

* * * * *